UNITED STATES PATENT OFFICE.

CARLETON ELLIS, OF WHITE PLAINS, NEW YORK.

FERTILIZER AND PROCESS OF MAKING SAME.

No. 847,749.  Specification of Letters Patent.  Patented March 19, 1907.

Application filed November 26, 1906. Serial No. 345,151.

*To all whom it may concern:*

Be it known that I, CARLETON ELLIS, a citizen of the United States, residing at White Plains, in the county of Westchester and State of New York, have invented certain new and useful Fertilizers and Processes of Making Same; and I do hereby declare the following to be a full, clear, and exact description of the same, such as will enable others skilled in the art to which it appertains to make and use the same.

This invention relates to fertilizers and processes of making the same, and consists in a fertilizer composed of a granular absorbent carrier containing soluble fertilizing bodies interiorly incorporated in the granules and having the granules exteriorly sealed by a permeable osmosis-permitting membrane or layer and in the process of producing such granular fertilizers, all as hereinafter more fully set forth and as claimed.

Plant-rootlets are very sensitive to saline solutions having a concentration above a certain limit, what is called an "isotonic strength." Solutions of greater strength wetting the roots will commonly wilt or kill the plant. In a florist's or nurseryman's establishment, where there are many hundred pots of plants to be taken care of, it is obviously almost impossible to treat each pot every day or so with the exact small quantity of soluble fertilizers which will suffice for the temporary needs of a plant without danger of adding too much. It has been endeavored to add the necessary quantity of soluble salts dissolved in the water used for watering; but it is inconvenient to do this and there is always risk of making the solution too strong. Furthermore, many of the soluble fertilizing bodies are incompatible with each other in solution—as, for instance, sulfate of ammonium and acid phosphate of calcium. For this reason recourse is generally made to insoluble fertilizers, such as blood and the like, the natural processes of the soil being relied upon to set free about the amount of fertilizer required by the needs of the plant at any given time. This is tolerably successful in so far as blood and similar organic nitrogenous fertilizers are concerned, putrefaction, conversion of organic nitrogen into ammonia, and subsequent conversion of the ammonia into nitrates going on with a fair degree of regularity under normal conditions and in normal soils. Though of course the earth in a pot is not under strictly normal conditions, yet as a rule the described actions take place with a sufficient degree of regularity; but quick-acting soluble nitrogenous fertilizers like nitrates and ammonia salts have the same dangers as attend other soluble salts. As regards the other fertilizing substances imperatively required for the growth of plants—namely, potash and phosphoric acid—no simple method has heretofore been discovered for making them progressively available in small but regulated amounts to potted plants. Practically all potassium compounds are very soluble in water, and if any amount of potassium salt be placed in the earth of a flower-pot it all dissolves on the first watering, forming solutions of dangerous strength. The only commercially available insoluble potash fertilizer—glauconite or green-sand marl—is not generally used in greenhouses or gardens, as it is bulky in comparison with the amount of potash actually contained, and the action of any given soil upon it is wholly uncertain. When phosphoric acid is added to pots in the form of alkali phosphates, the same dangers obtain as with the use of other soluble salts. Acid calcium phosphate or superphosphates when added in solution to a normal soil of course precipitates with iron, lime, and other bases therein contained, forming an infinitely-divided insoluble phosphate throughout the soil, which under normal conditions and in normal soils is progressively available as the plant needs it, the plant-rootlets dissolving it; but, as stated, the earth in a pot is not under normal conditions, and this normal action does not always take place therein. Further, solutions of acid phosphate before the precipitation occurs are also dangerous to plant-rootlets if of any considerable strength, both because beyond the isotonic limit and because of their sheer acidity.

In the present invention I have devised a means whereby any desired amount of soluble fertilizers may be added to earth in pots without danger to plants, forming, so to speak, a reserve store of fertilizing material upon which the plant-rootlets can slowly and progressively draw.

My invention consists in this fertilizing material and in the novel process of producing the same.

In making fertilizing material of the character described I take peat or any other material of a porous absorbent character when dry. Sawdust, granulated scoria, kieselguhr, fullers' earth, spent tanbark, dry distillery-slop, leather-powder, and a wide variety of other absorbent materials may be used. Leather-powder in particular slowly contributes nitrogen in use of the fertilizer. I, however, prefer peat and similar earthy materials containing much organic matter, both because of their physical character and because of themselves they contain considerable fertilizing value. This absorbent material I granulate into granules of suitable size. From pea size to pin-head size are suitable dimensions for ordinary purposes. The particular shape of the granules is not material. The granulated material is thoroughly dried and saturated with a solution of the particular fertilizing chemicals to be employed in such proportions as to produce a complete fertilizer for the particular plants with which it is to be used. As suitable fertilizing substances may be employed any of the soluble potassium salts, any of the soluble phosphates, and a nitrate or an ammonia compound. Generally all three of these fertilizer ingredients should be employed together. Potassium sulfate is a suitable potassium compound. Potassium chlorid is a cheap and convenient source of potassium, but is not so desirable as the sulfate, chlorin compounds not being particularly advantageous to plants. Potassium phosphate yields both potassium and phosphoric acid. Potassium nitrate yields both potassium and nitrogen to the plant. Ammonium phosphate is also a double fertilizer. Ammonium-potassium phosphate combines all three of the fertilizing requisites. Ammonium chlorid is a cheap and convenient source of available nitrogen, though, like potassium chlorid, having the disadvantage of introducing chlorin. Sodium nitrate is a convenient commercial form of nitrogen. Sodium phosphate is a cheap commercial form of phosphate. Soluble acid calcium phosphates may be employed and are particularly advantageous in some cases, as is hereinafter set forth, but should not ordinarily be employed in connection with sulfates such as potassium or ammonium sulfate, because of the double decomposition occurring when their solutions are mixed. Whichever salts are used, they are dissolved in water, customarily together, to form a tolerably concentrated solution. The peat granules are impregnated with the solution and are then slightly dried, so as to produce a moist but not wet surface thereon. This impregnation and drying may be repeated until the granules contain the desired amount of fertilizing ingredients.

When the impregnated granule has been produced and is dried to a moist but not wet consistence, all the soluble salts are contained in its interior if the operation is carefully performed. Should there be indications of soluble salts exteriorly of the granule, the granules may be finally wetted with a little water and the drying repeated.

The granules of peat or the like containing the soluble fertilizing salts are now exteriorly sealed by any means adapted to close the pores and prevent other than osmotic penetration of water. For this purpose the moist but not wet granules may be simply dusted or admixed with powdered calcium sulfate in the form of gypsum or plaster-of-paris or with dust-like slaked lime. Either in dissolving in the exterior moisture forms a solution which gives a precipitate with the contained phosphate. A rather better sealing substance is produced when the dissolved salts comprise a little alkali silicate. Either sodium or potassium silicate may be used, but preferably the latter. This silicate, where several impregnations are made, may be contained only in the final impregnating fluid, or it may be contained in all. When the silicate is not used, the phosphate employed may advantageously be the acid calcium salt and the sealing-powder slaked lime. Slaked lime is also very advantageous where the fertilizing mixture used contains soluble sulfates. With fertilizing mixtures containing the acid calcium phosphates the sealing means may be a solution of sodium silicate or milk of lime. A solution of sucrate of lime is also advantageous for this purpose. In using solutions in lieu of a dusting-powder the granules should be sharply dried and then thoroughly wetted with the solution or the milk of lime and once more dried. In all these modifications a precipitate is produced in the pores to close the same. Such pores may, however, be closed in a number of other ways. One, and a very advantageous one, is to fill the pores with a coagulated albumenoid. This contributes its quota to the fertilizing effect. For this purpose the dried granules may be simply moistened with a soluble cheap albumenoid, such as blood, and then heated to coagulate the same. The sealing effect may be gained with skim-milk where acid phosphate is a component of the fertilizer, since casein is precipitated in the pores. A soap solution used on granules containing acid phosphates precipitates fatty acids or fatty salts in the pores and forms an effective sealing agent. A "viscose" solution may also be employed. Paraffin alone or softened with hydrocarbon oil may also be employed, but has the disadvantage of penetrating too deeply and rendering the fertilizing salts too slowly available. Still, a certain proportion of granules thus sealed may often be usefully employed in admixture with granules otherwise sealed to form a reserve of fertility available for long periods of time. Skim-milk and casein preparations may also be used to film the surface and then the fertilizer granules may be exposed to formaldehyde, acetic acid, smoke, or other coagulants. Soluble starch, such as starch or flour paste, may be used to impregnate the surface and then the granules sharply dried. As starch once dried is difficult of solution, this furnishes an effective sealing means. Whatever the sealing means employed, the complete article forms a mass of granules, such granules containing in their interiors as concentrated a mass as may be desired of soluble fertilizing chemicals; but these saline bodies are sealed into the granule and cannot be dissolved out of it save by slow osmotic processes. Water does not filter through the granule itself, carrying with it dissolved salts, as it would if the granule were unsealed. A body of such granular fertilizing material mingled with the earth in a flower-pot, or itself used to fill the flower-pot, upon watering yields in the minimal time during which water is in contact with the granule only a limited amount of salts to such water; but the slight amount thus dissolved and the weak solution formed are exactly what the plant-rootlets require for their best development. The described material is of course quite as applicable to flower-beds and gardens as to potted plants.

To recapitulate, my material consists of a granulated absorbent body, preferably peat, containing interiorly incorporated a store of soluble fertilizing salts, each granule being exteriorly provided with a precipitated sealing material, preventing direct access of water or moisture to the contents of the granule, and my process consists in impregnating granular absorbent material with solutions of soluble fertilizing salts, either in one or in more stages, and in then sealing the pores. A mixture of Chile saltpeter, (sodium nitrate,) sodium phosphate, and potassium sulfate dissolved in water to a fairly concentrated solution, in such relative proportions as the needs of a particular plant may require, and admixed with more or less water-glass solution, when incorporated interiorly into granules of peat and then dusted with fine slaked lime produces a cheap and good fertilizer within the limits of my invention. Ammonium sulfate may be advantageously substituted for the Chile saltpeter as avoiding the introduction of sodium compounds, sodium having no utility to the plant. Potassium phosphate is better than sodium phosphate and potassium silicate than sodium silicate (ordinary water-glass) for the same reasons. The double phosphate of potassium and ammonium is particularly advantageous as introducing no waste matter; but the relative proportions of K, N and $P_2O_5$ are not suitable for some plants. It may be advantageously employed, however, as a component of mixtures.

The fertilizing salts being sealed within the interior of the granules, the exterior may be impregnated with bacterial cultures of nitrifying and other desirable bacteria without risk. Bacteria, like plant-rootlets, do not thrive in salt solutions of undue strength; but the osmosing solutions formed in use of my new fertilizer are of suitable strength for their growth. This is a very advantageous point, since it is found that, other things being equal, thrifty aerobic bacterial growth in the soil is desirable for growth of higher plants.

Another good fertilizer within the limits of my invention may be made by dissolving one pound of potassium phosphate and one pound of ammonium sulfate in a gallon and a half of water. This solution is used to impregnate fifteen pounds of peat. After impregnation and drying partially or wholly the peat is treated with one-half gallon of a thin syrupy solution of commercial casein dissolved in water and ammonia. The peaty mass is once more partially dried and, if necessary, broken up, caseinate having a tendency to glue the granules together. The granules are now thoroughly admixed with three pounds of calcium sulfate, ordinary plaster-of-paris or ground gypsum being perfectly suitable. The caseinate is largely rendered insoluble by the drying, and such as remains soluble is precipitated by the calcium sulfate, forming an insoluble lime caseinate. In making this form of fertilizer the impregnated granules may be simply agitated with the dry gypsum after nearly complete drying, the casein treatment being omitted. The phosphates react with the calcium sulfate to form calcium phosphate, which seals the pores.

With the stated fertilizing chemicals may also be used a modicum of potassium or sodium silicate. Though it may be used in the same solution, it is best added after the stated fertilizers have been incorporated in the granules, the dry or partly dry granules being moistened with a solution of a few per cent. of commercial water-glass in water and redried. On treatment of the granules with the casein in the manner described a highly-insoluble sealing compound is precipitated in the pores, or if the casein treatment be omitted the calcium sulfate alone will produce a similarly-insoluble precipitate.

What I claim is—

1. The process of making a fertilizer which consists in preparing a granular absorbent, transporting soluble fertilizers into the interior of the granules in a liquid vehicle, and finally superficially sealing said granules by depositing an insoluble material in their surface pores.

2. The process of making a fertilizer which consists in preparing a granular absorbent, forming a solution of soluble fertilizing bodies, impregnating the granules of the absorbent with said solution, drying the granules and finally superficially sealing said granules by closing the surface pores with an insoluble material.

3. The process of making a fertilizer which consists in preparing granulated peat, forming a solution of soluble fertilizing bodies, impregnating the peat granules with said solution, drying the granules and finally superficially sealing said granules by closing the surface pores with an insoluble material.

4. As a fertilizing material, a granular mass containing soluble fertilizing salts interiorly incorporated in its granules and sealed therein by insoluble matter closing the surface pores.

5. As a fertilizing material, a granular mass of peat having soluble fertilizing materials interiorly incorporated in its granules and sealed therein by insoluble matter closing the surface pores.

6. As a fertilizing material, a granular mass of peat having soluble fertilizing salts interiorly incorporated in its granules.

In testimony whereof I affix my signature in the presence of two witnesses.

CARLETON ELLIS.

Witnesses:
K. P. McELROY,
ROGER H. LYON.